United States Patent
Clark et al.

(10) Patent No.: US 7,237,843 B2
(45) Date of Patent: Jul. 3, 2007

(54) FOLDING HEAD RESTRAINT

(75) Inventors: Jeffrey L. Clark, Brighton, MI (US);
Juan Guerra, Ypsilanti, MI (US);
Anibal P. Margina, Westland, MI (US);
Scott R. Meachum, Milan, MI (US)

(73) Assignee: Johnson Controls Technology Company, Holland, MI (US)

( * ) Notice: Subject to any disclaimer, the term of this patent is extended or adjusted under 35 U.S.C. 154(b) by 24 days.

(21) Appl. No.: 11/036,601

(22) Filed: Jan. 14, 2005

(65) Prior Publication Data

US 2005/0179301 A1 Aug. 18, 2005

Related U.S. Application Data

(60) Provisional application No. 60/536,602, filed on Jan. 15, 2004.

(51) Int. Cl.
*B60N 2/48* (2006.01)

(52) U.S. Cl. ..................................... 297/408

(58) Field of Classification Search ............. 297/408, 297/391, 403, 409
See application file for complete search history.

(56) References Cited

U.S. PATENT DOCUMENTS

| | | | |
|---|---|---|---|
| 217,169 A * | 7/1879 | Taylor | 297/399 |
| 4,511,180 A | 4/1985 | Klaus | |
| 4,711,494 A | 12/1987 | Duvenkamp | |
| 4,822,102 A | 4/1989 | Duvenkamp | |
| 4,834,456 A | 5/1989 | Barros et al. | |
| 4,977,973 A * | 12/1990 | Takizawa | 297/408 |
| 5,590,933 A * | 1/1997 | Andersson | 297/408 |
| 5,669,668 A | 9/1997 | Leuchtmann | |
| 6,059,358 A | 5/2000 | Demick et al. | |
| 6,074,011 A | 6/2000 | Ptak et al. | |
| 6,129,421 A | 10/2000 | Gilson et al. | |
| 6,375,264 B1 | 4/2002 | Kienzle et al. | |
| 6,604,788 B1 | 8/2003 | Humer | |
| 6,612,653 B2 | 9/2003 | Takata | |
| 6,663,181 B2 * | 12/2003 | Nygren et al. | 297/408 |
| 6,902,232 B2 * | 6/2005 | Kamrath et al. | 297/61 |
| 2004/0245834 A1 * | 12/2004 | Schmitt et al. | 297/408 |
| 2005/0052065 A1 * | 3/2005 | Rothstein et al. | 297/403 |

* cited by examiner

*Primary Examiner*—Peter R. Brown
(74) *Attorney, Agent, or Firm*—Foley & Lardner LLP (57) ABSTRACT

A head restraint assembly adapted for inwardly rotating between a substantially upright use position and a relatively retracted storage position is disclosed. According to one exemplary embodiment, the head restraint assembly is configured for use with a vehicle seat having a collapsible seat back for providing improved clearance as the seat back moves between a use position and a storage position. The head restraint assembly generally includes a support member having a first portion adapted for pivotally coupling to the seat back and a second portion that outwardly extends through an aperture defined by a top surface of the seat back for supporting a head supporting cushion. The first portion of the support member has a substantially curvilinear profile for allowing the required size of the aperture in the top surface of the seat back to be minimized in a longitudinal direction relative to the seat back.

20 Claims, 6 Drawing Sheets

FOLDING HEAD RESTRAINT

CROSS-REFERENCE TO RELATED PATENT APPLICATIONS

This application claims the benefit under 35 U.S.C. 119(e) of U.S. Provisional Patent Application No. 60/536,602, entitled "FOLDING HEAD RESTRAINT," having a filing date of Jan. 15, 2004, the disclosure of which is hereby incorporated by reference.

BACKGROUND

The present invention relates generally to the field of head restraints for a seat and in particular for a vehicle seat. More particularly, the present invention relates to the field of movable head restraints for a vehicle seat having a seat back that is configured to move between a generally upright use position and a relatively collapsed or otherwise retracted stowed position.

It is generally known to provide a head restraint that extends upward from a seat back of a vehicle seat. It is also generally known to provide vehicle seat with a seat back that is configured to move between a generally upright use position and a retracted stowed or storage position (i.e., a collapsible vehicle seat). Providing a collapsible vehicle seat may be advantageous for a variety of reasons such as providing additional storage or cargo space within the vehicle or improving access to other areas within the vehicle that may otherwise be limited because of the presence of a vehicle seat or components thereof (e.g., arm rests, head restraints, etc.).

Collapsing the seat back of a vehicle seat, and in particular a seat back of a second or third row vehicle seat, that supports an upwardly extending head restraint is often difficult due to interference caused by the extended height of the vehicle seat back due to the head restraint (i.e., insufficient clearance between the seat back and/or head restraint and a second article within the vehicle). For example, a head restraint outwardly extending from a seat back is likely to strike or otherwise contact an article within the vehicle (e.g., a seat back positioned in front of the rotating seat back, an instrument panel, an overhead component, etc.) when the seat back is collapsed, thereby preventing the stowed or storage position from being obtained.

Vehicle seats having movable head restraints have been developed in an attempt to overcome the spatial obstacles presented when moving a seat back from a use position to a stowed position. A typical arrangement for such a movable head restraint is to provide a folding mechanism for moving the head restraint from a generally upright use position to a storage position. The folding mechanism is typically coupled to the head restraint support posts that extend upward from the upper portion of the seat back and which mount the head restraint to the seat back. The support posts are rotated through an arc of approximately 90° to fold the head restraint to a storage portion. Openings are provided in the seat back to enable forward or rearward rotation of the support posts. Conventionally used linear support posts require longitudinally extending openings of substantial size in the seat back to enable rotation of the support posts. If it is desirable to have the support posts travel through an arc greater than 90°, the size of the opening must be increased accordingly. Substantially sized openings in the seat back may be undesirable for aesthetic and craftsmanship purposes and often cannot be adequately concealed.

It would be advantageous to provide a vehicle seat assembly having a seat back that collapses to a generally flat stowed position wherein a relatively flat load floor is created when the vehicle seat assembly is in the stowed position. It would also be advantageous to provide a collapsible vehicle seat assembly having a head restraint for every location intended to receive a seat occupant. It would further be advantageous to provide a head restraint that retracts to a storage position to provide clearance between the collapsible seat back and an article within the vehicle. It would further be advantageous to provide a head restraint that is configured to minimize the required size of the opening in the seat back for enabling inward rotation of the head restraint. It would further be advantageous to provide a head restraint that is configured to inwardly rotate an angular distance greater than 90° to improve the "flatness" that can be achieved when the vehicle seat is in the stowed position. It would further be advantageous to provide a head restraint that is configured to inwardly rotate an angular distance greater than 90° while still being able to minimize the size of the required opening in the seat back. Accordingly, it would be advantageous to provide a head restraint for use with a vehicle seat providing one or more of these or other advantageous features.

SUMMARY

According to one exemplary embodiment, a head restraint for use with a seat having a seat back includes a support member having a first portion adapted for pivotally coupling to the seat back and a second portion configured to outwardly extend through an aperture in the seat back. The head restraint further includes a cushion coupled to the second portion of the support member. The support member is configured to inwardly rotate about the first portion towards a front surface of the seat back from an upright use position to a retracted storage position. The first portion of the support member has a curvilinear profile curving more than 180 degrees for minimizing the required size of the aperture in the seat back.

The curvilinear profile of the support member enables the size of the aperture in the seat back to be minimized by complementing the profile of the upper portion of the seat back as the support member moves between the use position and the storage position. According to one exemplary embodiment, the curvilinear profile of the first portion of the support member is an arcuated shape wherein the inner portion of the curve faces the front surface of the seat back as the head restraint moves between the use position and the storage position. According to one exemplary embodiment, the second portion of the support member has a relatively linear profile compared to the first portion. According to the various suitable embodiments, the second portion may be slightly curved, or include a curved portion, but is relatively linear in comparison to the curvilinear profile of the first portion. Preferably, the support member is a substantially J-shaped support member, but alternatively, may be any other suitable shape within the scope of the appended claims. According to one exemplary embodiment, a pair of support members are used to support the cushion.

According to another exemplary embodiment, a vehicle seat includes a seat back defined at an upper portion by a front surface, a top surface, and a rear surface. The vehicle seat further includes a head restraint support member having a first portion pivotally coupled to the seat back and a second portion outwardly extending through an aperture in the seat back, and a head restraint cushion coupled to the second portion of the head restraint support member. According to one exemplary embodiment, the aperture is defined entirely by the top surface of the seat back and does not extend into the front surface and/or the rear surface. The first portion of the head restraint has a curvilinear profile for allowing the head restraint support member to inwardly rotate at least 90 degrees from an upright use position to a retracted storage position. According to one exemplary embodiment, the curvilinear profile of the first portion of the head restraint support is concealed within the upper portion of the seat back.

According to another exemplary embodiment, the vehicle seat is configured as a collapsible vehicle seat. The seat back moves between an upright use position and a retracted storage position. To obtain the storage position, the seat back inwardly rotates until it is substantially parallel with the seat base. Incorporation of a movable head restraint assembly enables the seat back to obtain the storage position by reducing the overall height of the seat back thereby reducing the likelihood that the seat back will strike or otherwise contact another object of the vehicle as the seat back is being inwardly rotated to the stowed position. The head restraint assembly is adapted for inwardly rotating an angular distance sufficient for the seat back to obtain the storage position. According to one exemplary embodiment, the head restraint assembly is adapted for inwardly rotating an angular distance greater than approximately 90° to allow the seat back to obtain the storage position and/or so that greater "flatness" of the seat back in the storage position can be achieved. The seat assembly further includes a release mechanism that when actuated controls the movement of at least one of the seat back and the head restraint, and preferably, controls the movement of both the seat back and the head restraint so that when the seat back is collapsed, the head restraint is simultaneously collapsed. According to one exemplary embodiment, the head restraint cushion does not extend beyond an upper end of the seat back when the head restraint cushion is in the storage position.

DETAILED DESCRIPTION

Figure 1:
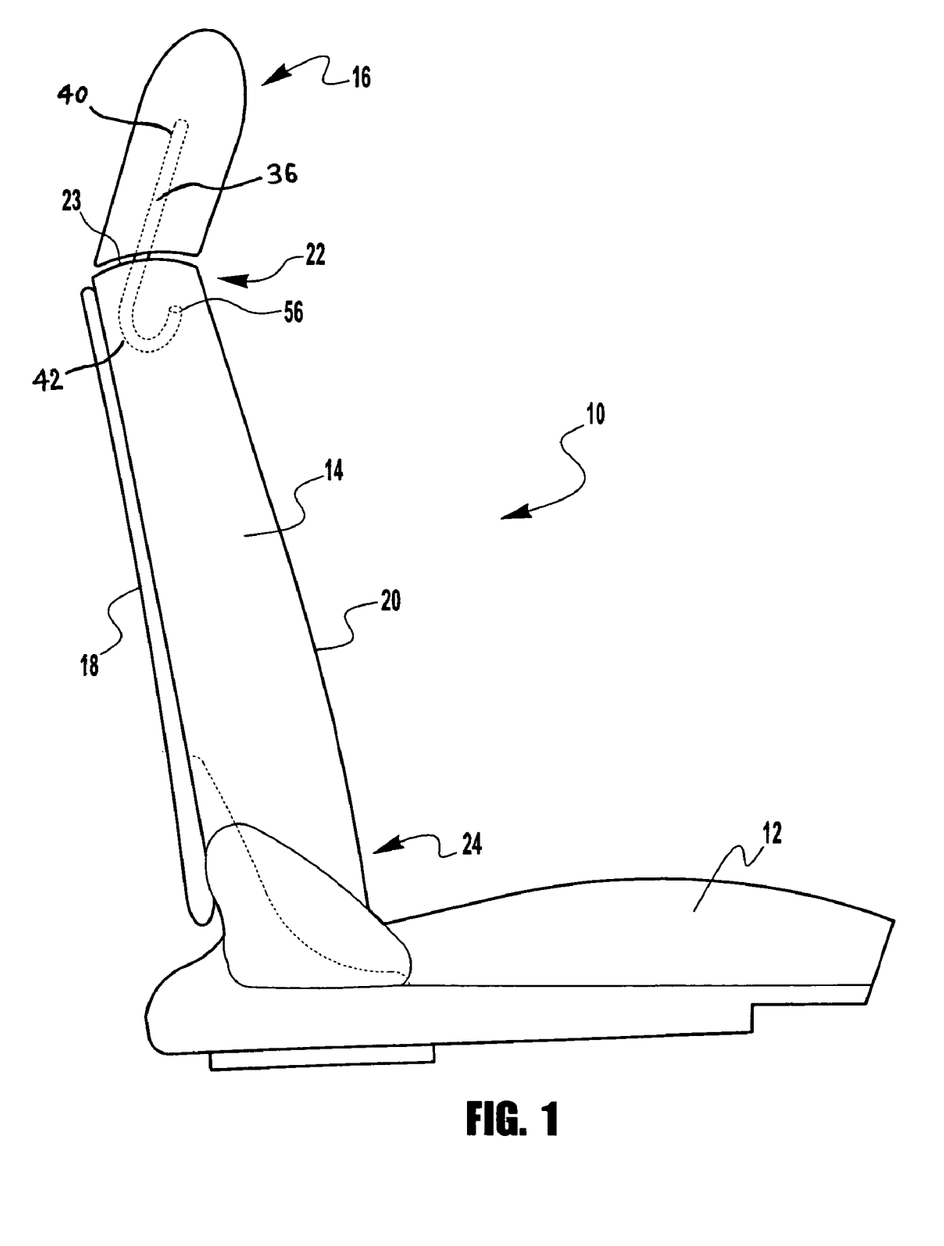
FIG. 1 is a side view of a vehicle seat assembly comprising a head restraint assembly according to one exemplary embodiment.
Figure 2:
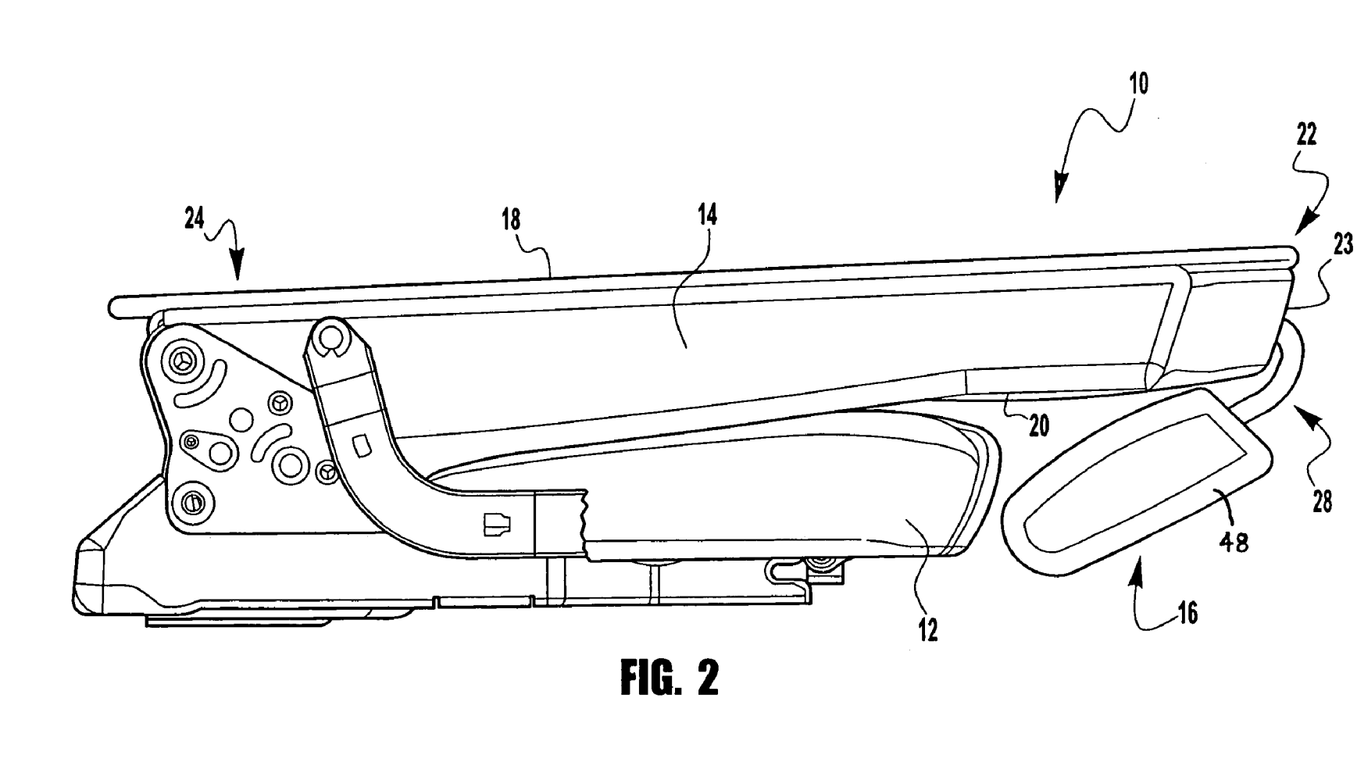
FIG. 2 is a side view of the vehicle seat assembly of FIG. 1 showing the vehicle seat and the head restraint assembly in a storage position.
Figure 3:
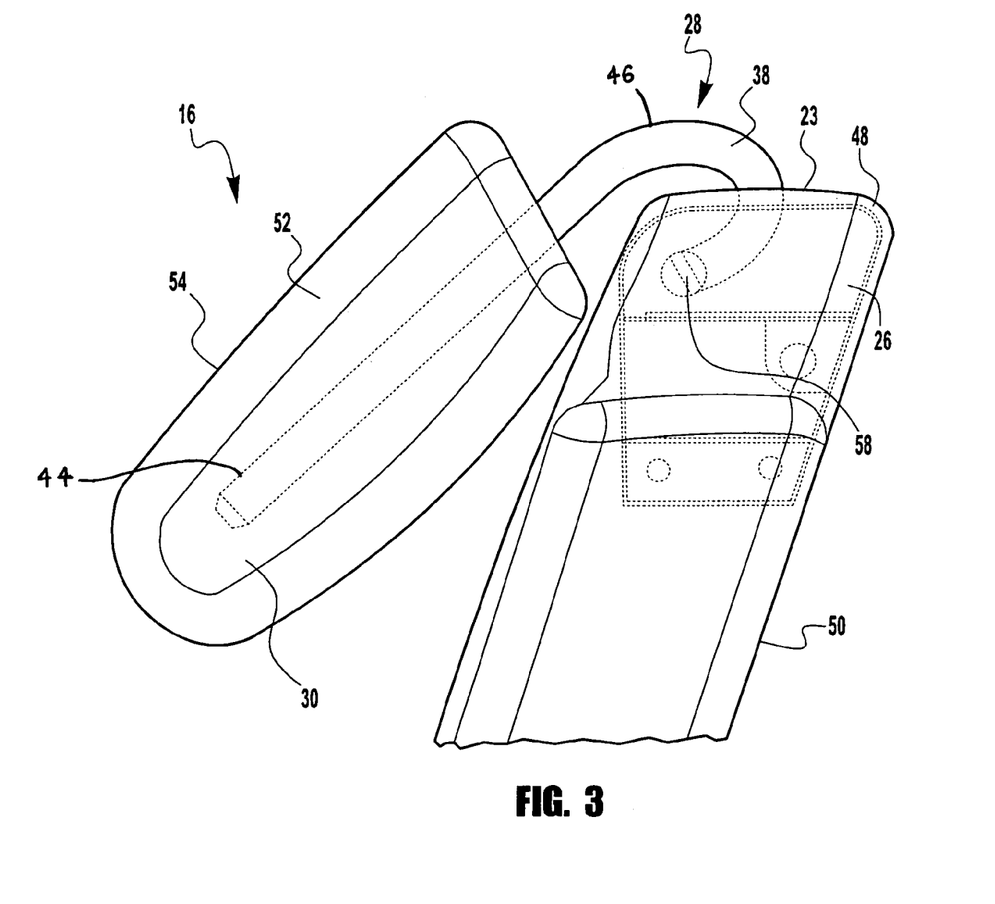
FIG. 3 is a detailed partial side view of the head restraint assembly of FIG. 1 shown in the storage position.

Referring generally to FIGS. 1 through 6, a seat assembly 10 and components thereof are shown according to exemplary embodiments. Referring particularly to FIGS. 1 and 2, a seat assembly 10 having a head restraint assembly 16 is shown according to one exemplary embodiment. Seat assembly 10 is shown as being a collapsible seat assembly configured to move between a first or use position (e.g., seating position, upright position, etc.), shown in FIG. 1, and a second or storage position (e.g., stowed position, collapsed position, retracted position, etc.), shown in FIG. 2. It should be noted at the outset that head restraint assembly 16 is suitable for use with a variety of seating applications, including seat assemblies that are not collapsible.

Seat assembly 10 is preferably configured for use as a rear seat (e.g., a second row seat, a third row seat, etc.) in a vehicle, such as a sport utility vehicle, minivan, full-size van, pick-up truck, hatch-back, station-wagon, or the like. Seat assembly 10 is also suitable for use as a front seat of a vehicle, such as a front passenger seat. According to various alternative embodiments, seat assembly 10 may be used internally or externally in other vehicle applications such as boats or airplanes, and non-vehicular seating applications such as office furniture or roller coasters.

Seat assembly 10 generally includes a seat back 14 movably coupled relative to a lower seat 12. Seat assembly 10 is shown as further including a head restraint assembly 16 movably coupled to seat back 14. Seat assembly 10 is configured to move between the use position and the storage position. Such movement may be mechanically actuated and/or electrically actuated. When seat assembly 10 is moved into the storage position, head restraint assembly 16 is configured to move (e.g., retract, collapse, fold, etc.) inward (e.g., forward, etc.) relative to a front surface 20 of seat back 14 to provide increased clearance between the collapsing seat assembly 10 and other articles within the vehicle (e.g., seats positioned in front of the collapsible seat, instrument panels, an overhead components, consoles, etc.). According to one exemplary embodiment, a cushion 48 of head restraint assembly 16 does not extend beyond an upper portion of seat back 14 when head restraint assembly 16 is moved the storage position (see FIG. 2). According to another exemplary embodiment, cushion 48 of head restraint assembly 16 only extends slightly beyond an upper portion of seat back 14 when head restraint assembly 16 is moved the storage position (see FIG. 3).

Seat back 14 includes an upper portion 22 and a lower portion 24 at least partially defined by a back portion or surface 18 and a front portion or surface 20, with upper portion 22 being further defined by a substantially top surface 23. Lower portion 24 of seat back 14 is shown pivotally coupled to lower seat 12, while upper portion 22 is configured to receive head restraint assembly 16. Seat back 14 is rotatable in an inward direction (e.g., forward, etc.) relative to lower seat 12 to enable seat assembly 10 to obtain the storage position, and preferably is also rotatable in a rearward direction so that a seat occupant may selectively control the angle of seat back 14 relative to lower seat 12. In the storage position, seat back 14 folds inward (i.e., front surface 20 of seat back 14 is folded towards lower seat 12) until front surface 20 is near lower seat 12 and back portion 18 is substantially parallel with lower seat 12 or a structure to which lower seat 12 is coupled.

Lower seat 12 may be rigidly (e.g., fixedly, etc.) coupled to the vehicle (e.g., a vehicle floor, etc.) or alternatively, lower seat 12 may be movably coupled to the vehicle. For example, lower seat 12 may be slidably coupled to a vehicle floor and adapted for translational movement in a fore and aft direction of the vehicle and/or in a lateral direction (i.e., side to side) of the vehicle. According to other suitable exemplary embodiments, lower seat 12 may be detachably coupled to the vehicle thereby allowing an operator to selectively remove seat assembly 10 from the vehicle.

Referring particularly to FIGS. 3 through 6, head restraint assembly 16 includes a base member 26, one or more support members 28, and a cushioned or padded surface, shown as a headrest 30: Base member 26 movably supports support members 28 and headrest 30, while headrest 30 is configured to receive the head of a seat occupant. According to an exemplary embodiment, base member 26 is fixedly coupled to upper portion 22 of seat back 14 and configured to movably secure support members 28 relative to the seat back 14. Base member 26 can be fabricated from any suitable metal or other suitable material capable of withstanding the forces associated with head restraint systems.

Preferably, base member 26 is coupled to upper portion 22 of seat back 14 by fastening base member 26 to a vehicle seat frame (not shown) of seat back 14 using any suitable technique, or combination of techniques, including, but not limited to, mechanical fasteners (screws, bolts, rivets, pins, etc.), a welding operation, etc. According to an alternative embodiment, base member 26 may be integrally formed (i.e., provided as a one-piece component) with the vehicle seat frame of seat back 14. Base member 26 is a generally rigid component that is subsequently covered by a cushion 48 and/or a trim cover 50. Cushion 48 and trim cover 50 may be provided as separate layers, or alternatively, may be provided as an integrally formed covering. Cushion 48 and/or trim cover 50 may be uniformly disposed over all or part of base member 26, or alternatively, may be selectively applied in particular regions of base member 26.

Figure 5:
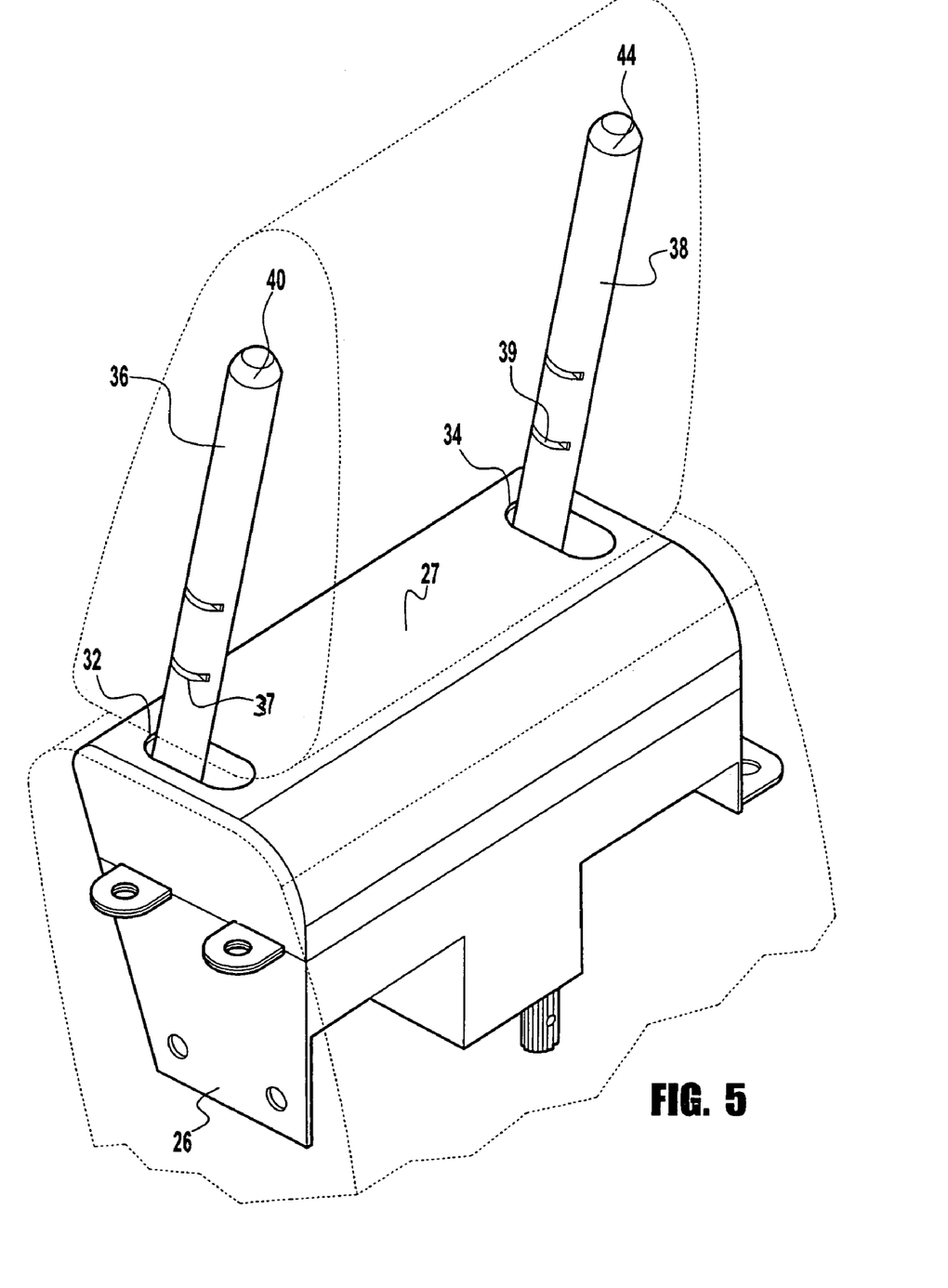
FIG. 5 is a perspective view of components of the head restraint assembly of FIG. 1 according to an exemplary embodiment shown in the use position.
Figure 6:
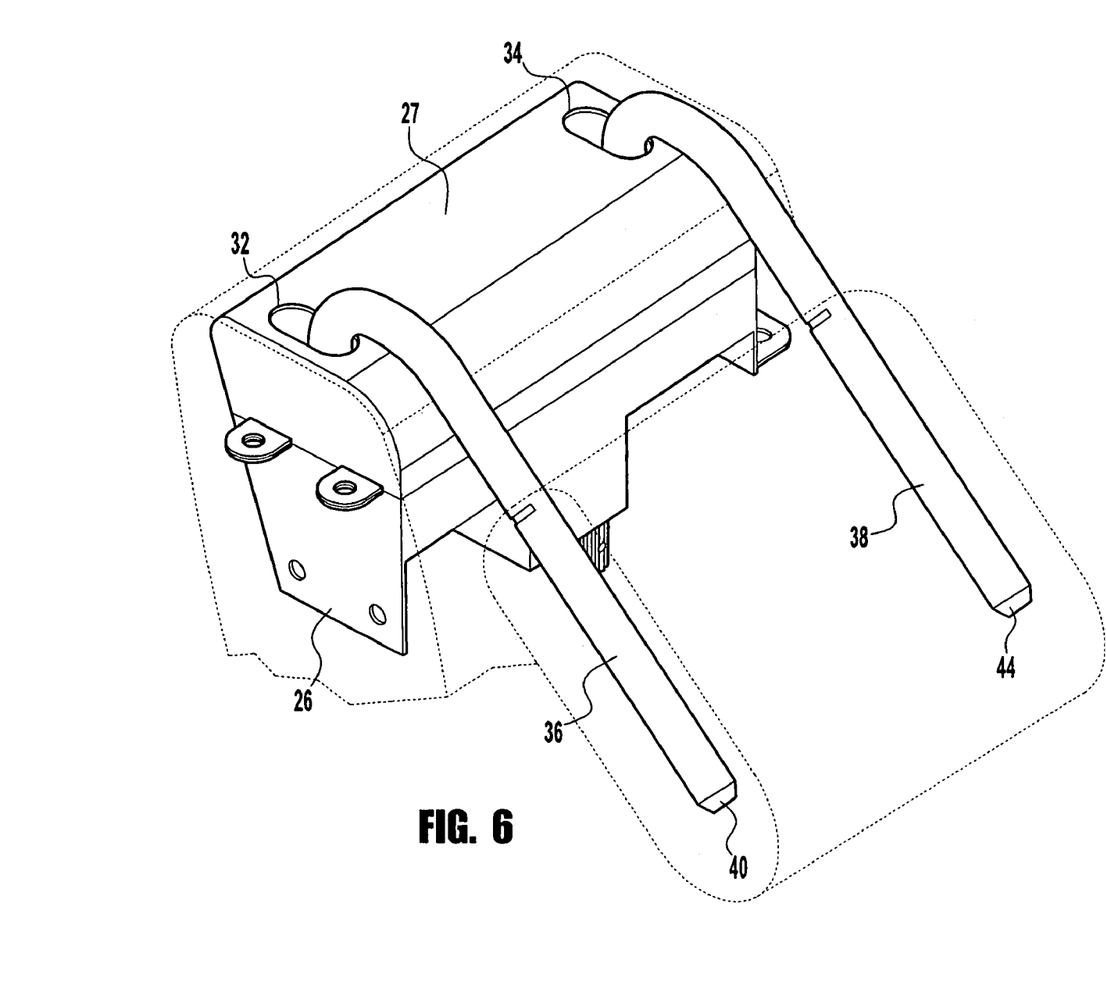
FIG. 6 is a perspective view of components of the head restraint assembly of FIG. 5 shown in the storage position.

Base member 26 retains support members 28 in such a manner as to allow for the pivotal movement of support members 28 relative to base member 26. Referring particularly to FIGS. 5 and 6, base member 26 includes an aperture (e.g. opening, slot, void, notch, channel, etc.) in a top surface 27 for receiving support members 28 and allowing support members 28 to outwardly extend therefrom. Base member 26 is shown as including a pair of slots 32, 34 (a separate slot for each support members 28), but alternatively, may include a single opening for servicing any number of support members 28 (e.g., an elongated slot extending in a lateral direction relative to seat back 14). Slots 32, 34 are shown as extending in a longitudinal direction relative to seat back 14 to allow support members 28 to rotate as head restraint assembly 16 moves between the use position and the storage position.

Cushion 48 and/or trim cover 50 extend over top surface 27 and include cutout or missing portions corresponding to slots 32, 34. As discussed in further detail below, the shape (i.e., side profile) of support members 28 advantageously allows the size of slots 32, 43 (and thereby cutout or missing portions of cushion 48 and/or trim cover 50) to be minimized in a longitudinal direction, while still allowing for the rotational movement of support member 28, even if rotated a distance greater than 90°.

Support members 28 are mounted to and outwardly extend from upper portion 22 of seat back 14. According to a preferred embodiment, support members extend from top surface 23 of upper portion 22. According to the embodiment shown, support members 28 comprise a pair of support posts 36, 38 having upper portions 40, 44 and lower portions 42, 46 respectively. Support posts 36, 38 are shown as being solid members having generally circular cross sections, but alternatively may be tubular members, and/or may have any of a variety of cross sections such as, but not limited to, rectangular, octagonal, elliptical, triangular, trapezoidal, etc.

It should be noted that while a pair of support posts 36, 38 are illustrated in the FIGURES, the present invention is equally applicable with seating applications utilizing only one support member or seating applications utilizing a number of support members greater than two. According to an alternative embodiment, support posts 36, 38 may be joined by a supplemental support member positioned somewhere between upper portions 40, 44 and lower portions 42, 46. For example, a supplemental support member that is substantially perpendicular to support posts 36, 38 may be coupled near upper portions 40, 44 of support posts 36, 38 to provide increased rigidity to head restraint assembly 16. Such a supplement support member may be provided as a separate component or may be integrally formed with support posts 36, 38 to form a generally U-shaped support member 28.

Lower ends 42, 46 of support posts 36, 38 are movably coupled to base member 26 to allow headrest 30 be folded inward towards front surface 20 of seat back 14. Preferably, lower ends 42, 26 are pivotally coupled to base member 26 to provide for the rotational movement of headrest 30 in a reciprocating pivotal manner between the downward storage position (shown in FIG. 3) and the upright head support position (shown in FIG. 4). Lower ends 42, 46 are pivotally coupled to base member 26 via pivot shaft, shown as a pair of pivot pins 56, 58 respectively.

Upper ends 40, 44 of support posts 36, 38 are configured to support the headrest 30. Headrest 30 is supported by upper ends 40, 44 using any known or otherwise suitable technique for supporting a head rest. Headrest 30 may be fixedly coupled to upper ends 40, 44, or alternatively, may be movably coupled to upper ends 40, 44. A head rest that is fixedly coupled to upper ends 40,44 can be sized and configured to accommodate seat occupants of various sizes. Movably coupling (e.g., in a vertical direction, etc.) a head rest to upper ends 40, 44 allows a seat occupant to selectively position the head rest in an optimal position and may allow the overall size of the head rest to be reduced.

According to the exemplary embodiment shown, headrest 30 is slidably movable in the vertical direction by providing a plurality of circumferential notches 37, 39 (e.g., slots, grooves, channels, etc.) along support posts 36, 38 which cooperate with a biased engaging member (not shown) coupled to the headrest 30. The height of headrest 30 can be adjusted by disengaging the biased engaging member from notches 37, 39 and moving the head rest to a new position. Support posts 36, 38 themselves are not adjustable in a vertical direction relative to seat back 14, but various alternative embodiments may include adjustable support posts. For example, vertical adjustability may be achieved by utilizing such mechanisms as telescoping members at upper ends 40, 44 of support posts 36, 38.

Referring back to FIGS. 3 and 4, headrest 30 is shown as including a cushion 52 that covers upper ends 40, 44 of support posts 36, 38 and a trim cover 54 that covers cushion 52. Headrest 30 may further include a head rest frame (not shown). Similar to cushion 48 and trim cover 50 which cover seat back 14, cushion 48 and trim cover 50 may be provided as separate layers, or alternatively, may be provided as an integrally formed covering. Trim cover 54 and cushion 52 includes apertures allowing support posts 36, 38 to outwardly extend from headrest 30. According to various alternative embodiments, upper portions 40, 44 may not be covered by a cushion or a trim cover. For example, headrest 30 may include a suspension fabric material installed around support members 40, 44 in place of cushion 52 and/or trim cover 54. Alternatively, a combination of a cushion, a trim cover, and a suspension fabric material may define headrest 30.

According to one exemplary embodiment, cushion 52 and trim cover 54 cooperate to provide a relatively solid head rest suitable for providing an impact area designed to receive the head of a seat occupant. According to an alternative embodiment, cushion 52 and trim cover 54 may define an opening in headrest 30 (e.g., a halo or U-shaped configuration, etc.) for improved visibility when head restraint assembly 16 is in the upright use position.

To allow the size of slots 32, 34 to be reduced, thereby allowing the size of corresponding apertures in upper portion 22 (e.g., top surface 23) of seat back 14 (particularly cushion 48 and/or trim cover 50) to be reduced in a longitudinal direction, support posts 36, 38 include lower ends 42, 46 with curvilinear side profiles. The curvilinear profiles of lower ends 42, 46 enable support posts 36, 38 to avoid contact with the profile of upper portion 22 of seat back 14 as support posts 36, 38 and headrest 30 are inwardly rotated towards front surface 20 of seat back 14. According to a preferred embodiment, the curvilinear profile is configured so that support posts 36, 38 may be angularly displaced a distance greater than 90° when inwardly rotating to the storage position while confining the required aperture in upper portion 22 to top surface 23. By utilizing a curvilinear support member 28 rather than the conventionally used linear support member, headrest 30 may be folded inward without requiring the substantially sized slots that a linear support member requires.

According to one exemplary embodiment, lower ends 42, 46 of support posts 36, 38 have an arcuated profile, while upper ends 40, 44 have a relatively linear profile compared to lower ends 42, 46. For example, according to a preferred embodiment, support posts 36, 38 are substantially J-shaped members with the bottoms, or curved portions of the J, constituting lower ends 42, 46 of support posts 36, 38, and the tops, or relatively linear portions of the J, constituting upper ends 40, 44 of support posts 36, 38. The J-shaped members are pivotally coupled to base member 26 in a manner which allows the inner portion of the J to face front surface 20 of seat back 14 as support posts 36, 28 are rotated towards the storage position. Preferably, the arcuated profile of lower ends 42, 46 complements (e.g., conforms to, matches, etc.) the profile of upper portion 22 of seat back 14 to provide clearance around upper portion 22 when support posts 36, 38 are rotated to the storage position.

Figure 4:
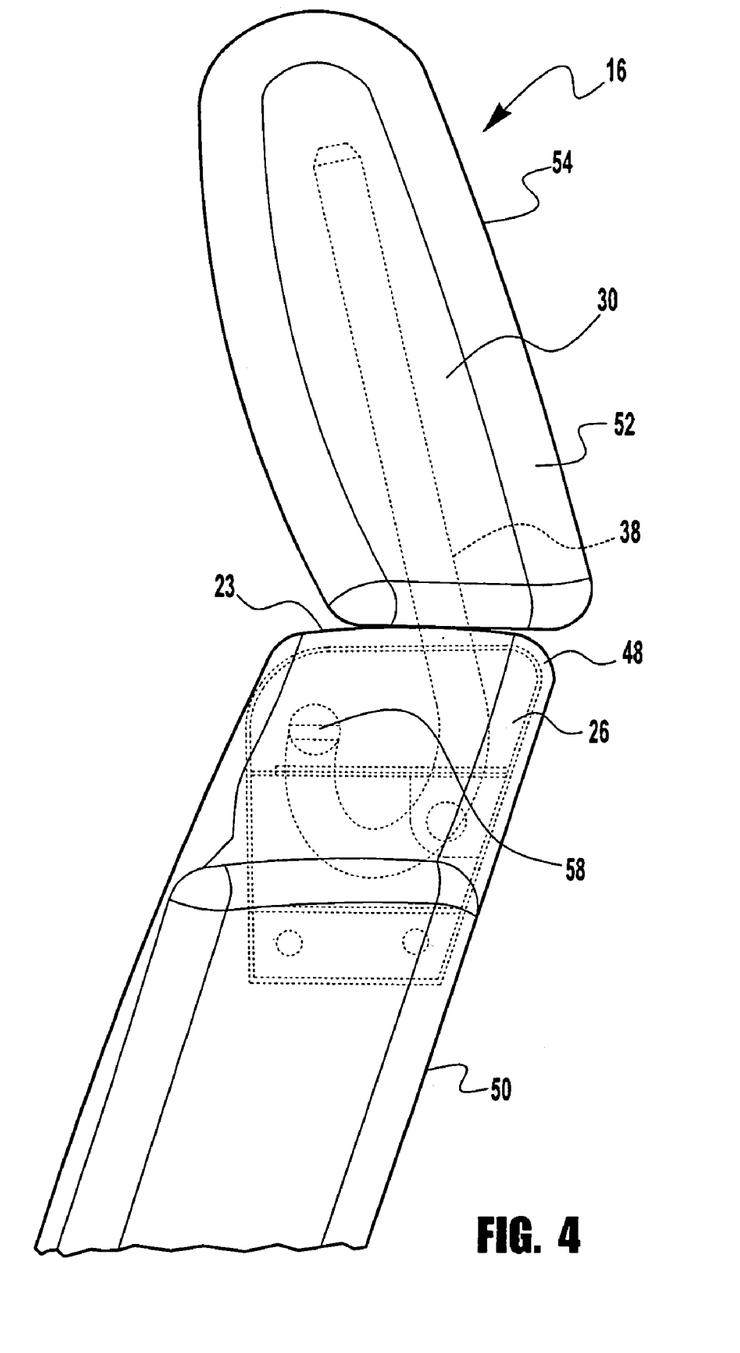
FIG. 4 is a detailed partial side view of the head restraint assembly of FIG. 1 shown in the use position.

FIG. 4 shows the curvilinear profile of lower ends 42, 46 includes a substantially continuous curve 55 which begins at a start point 57 and continues to an end point 59. Preferably, curve 55 curves motion than 180 degrees as it curves from start point 57 to end point 59. According to various alternative embodiments, curve 55 may curve substantially more than 180 degrees or may curve approximately 180 degrees or less. The degree of curvature is selected to achieve a particular result, and therefore is likely to vary depending on the particular configuration of seat back 14.

Referring to generally to the FIGURES, lower ends 42, 46 of support posts 36, 38 (particularly the curvilinear portions) are shown as being substantially concealed within upper portion 22 of seat back 14 when head restraint assembly 16 is in the use position. Such a configuration improves vehicle aesthetics by allowing components of head restraint assembly 16 to be hidden from the view of a vehicle occupant. According to the various suitable embodiments, in the use position, headrest 30 may extend downward until contacting upper portion 22 of seat back 14, or alternatively, a gap may be provided between headrest 30 and upper portion 22 thereby partially exposing a portion of support posts 36, 38 between upper ends 40, 44 and lower ends 42, 46.

Headrest 30 may be retracted to the storage position by actuating a release mechanism (not shown) preferably coupled to the vehicle seat. According to an exemplary embodiment, a lever may be provided on seat back 14 for selectively controlling the folding of headrest 30. A number of mechanisms may be used to release and retract headrest 30 such as a solenoid, electric motor, cable, Bowden cable, rope, strap, mechanical linkage, hydraulics, pneumatics, etc. According to a preferred embodiment, actuation of the same release mechanism retracts head restraint assembly 16 and seat back 14 to the storage position. According to a particularly preferred embodiment, a single actuation of the release mechanism simultaneously retracts head restraint assembly 16 and seat back 14 to the storage position. According to various alternative embodiments, a separate release mechanism may be used to control head restraint assembly 16 and seat back 14. According to a further alternative embodiment, head restraint assembly 16 may be rotated to the storage position without collapsing seat back 14. According to yet a further alternative embodiment, a release mechanism used to move seat back 14 to the storage position also enables a seat occupant to selectively move the generally upright seat back 14 rearwardly to provide comfort to the seat occupant.

In operation, seating assembly 10 is configured to move between the use position and the storage position. According to a preferred embodiment, seat assembly 10 obtains the storage position by the actuation of a release mechanism (not shown). Actuation of the release mechanism initiates the inward rotation of head restraint assembly 16 so that as seat back 14 is collapsed, additional clearance between the collapsing seat assembly and an article near the seat assembly may be achieved. Support posts 36, 38 and headrest 30 rotates inward (i.e., toward the front surface 20 of seat back 14) an angular distance sufficient to provide the necessary clearance. According to a preferred embodiment, headrest 30 is inwardly rotated an angular distance that is greater than 90° and/or an angular distance that places a front portion of headrest 30 adjacent to or otherwise near front surface 20 of seat back 14. Lower ends 42, 46 of support posts 36, 38 have an arcuated profile that allows slots 32, 34 in base member 26 (and thereby the corresponding openings in cushion 48 and/or trim cover 50) to be smaller in a longitudinal direction than if a linear support member was used and required to move along the same trajectory. The corresponding smaller openings in cushion 48 and/or trim cover 50 improve the aesthetics of seat assembly 10.

It is important to note that the construction and arrangement of the components of the seat assembly provided herein are illustrative only. Although only a few exemplary embodiments of the present invention have been described in detail in this disclosure, those skilled in the art who review this disclosure will readily appreciate that many modifications are possible in these embodiments (such as variations in the types of seats for which the present invention is incorporated with, sizes, structures, shapes and proportions of the various elements, mounting arrangements, use of materials, combinations of shapes, etc.) without materially departing from the novel teachings and advantages of the invention. For example, the shape of support posts 36, 38 may be any curvilinear shape that allows support posts 36, 38 to inwardly rotate towards front surface 20 of seat back 14 and allows the size of the required aperture in cushion 48 and/or trim cover 50 to be minimized in a longitudinal direction. Preferably, the curvilinear portion complements upper portion 20 of seat back 14 to allow support posts 36, 38 to be inwardly rotated an angular distance of approximately 90° or greater without requiring the aperture formed in front surface 20 of seat back 14. According to various other suitable embodiments, support posts 36, 38 may have curvilinear profiles including, but are not limited to, parabolic, sinusoidal, or toroidal shapes. In addition, the shape of support posts 36, 38 may be generally J-shaped, but wherein upper ends 40, 44 include substantially non-linear portions (e.g., the upper portion of the J may curve inward or outward) and/or wherein lower ends 42, 46 include linear portions (e.g., the bottom of the J being flattened). Further, the present invention is suitable for use with seats having a seat back which remains substantially upright and which include a folding head restraint that may be folded down for reasons such as improving visibility throughout a vehicle. Such an application particularly applicable for rear seats of an automobile where a heightened head restraint may obstruct the driver's rear or side views. A release mechanism may be provided near the driver that when actuated folds the heightened head rest inward to a collapsed position without additionally collapsing the seat back. Collapsing the heightened head rest will improve visibility throughout the vehicle. Further, it is readily apparent that in all embodiments head restraint assembly 16 may be rotated inward an angular distance of 90° or less and is not limited to a head rest that pivots 90° or more. In addition, it is not necessary for the front portion of headrest 30 to be adjacently positioned next to front surface 20 of seat back 14 when in the storage position. According to alternative embodiments, it may only be necessary to rotate headrest 30 a slight amount in order to achieve the desired clearance. Further, head restraint assembly 16 may be configured to rotate in a rearward direction or may further be designed to rotate into the use position once a seat occupant is seated. Accordingly, all such modifications are intended to be within the scope of the invention.

While the present invention has been described in connection with a particularly preferred embodiment thereof, the invention is not to be limited by the drawings. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A head restraint for use with a seat having a seat back, the head restraint comprising:
   a support member having a first portion adapted for pivotally coupling to the seat back and a second portion configured to outwardly extend through an aperture in the seat back; and
   a cushion coupled to the second portion of the support member,
   wherein the support member is configured to rotate towards a front surface of the seat back more than 90 degrees from an upright use position to a retracted storage position,
   wherein the first portion of the support member has a curvilinear profile curving more than 180 degrees for minimizing the required size of the aperture in the seat back.

2. The head restraint of claim 1, wherein the curvilinear profile is a substantially continuous curve.

3. The head restraint of claim 1, wherein the first portion of the support member is concealed within the seat back when in the use position.

4. The head restraint of claim 1, further comprising a base member configured to be fixedly coupled to the seat back, wherein the support is pivotally coupled to the base member.

5. The head restraint of claim 1, wherein the second portion of the support member has a relatively linear profile compared to the first portion.

6. The seat assembly of claim 5, wherein the support member is a substantially J-shaped support member.

7. The head restraint of claim 1, wherein the support member comprises a pair of support members.

8. A folding vehicle seat comprising:
   a seat back configured to be transitioned from an upright use position to an inwardly retracted stowed position wherein the seat back is substantially parallel with a seat base;
   a head restraint support member having a first portion pivotally coupled to the seat back and a second portion outwardly extending through an aperture in the seat back; and
   a head restraint cushion coupled to the second portion of the head restraint support member,
   wherein the first portion of the head restraint support member has a curvilinear profile complementing an upper portion of the seat back for allowing the head restraint support member to rotate at least 90 degrees from an upright use position to a retracted storage position,
   wherein the head restraint cushion is substantially aligned with the seat base when the head restraint support member is moved to the storage position and the seat back is moved to the stowed position.

9. The folding vehicle seat of claim 8 wherein the first portion of the head restraint support member is substantially concealed within the seat back when the head restraint support member is in the upright use position.

10. A folding vehicle seat comprising:
    a seat back configured to be transitioned from an upright use position to an inwardly retracted stowed position wherein the seat back is substantially parallel with a seat base;
    a head restraint support member having a first portion pivotally coupled to the seat back and a second portion outwardly extending through an aperture in the seat back; and
    a head restraint cushion coupled to the second portion of the head restraint support member,
    wherein the first portion of the head restraint support member has a curvilinear profile complementing an upper portion of the seat back for allowing the head restraint support member to rotate at least 90 degrees from an upright use position to a retracted storage position,
    wherein the a front surface of the head restraint cushion is substantially adjacent to the front surface of the seat back when in the storage position.

11. The folding vehicle seat of claim 10 wherein the head restraint cushion does not extend beyond an upper portion of the seat back when the head restraint support member is moved to the storage position for minimizing interference as the seat back is moved the stowed position.

12. The folding vehicle seat of claim 10 wherein the first portion of the head restraint support member is substantially concealed within the seat back when the head restraint support member is in the upright use position.

13. The folding vehicle seat of claim 10 wherein the support member is substantially J-shaped.

14. The folding vehicle seat of claim 10 wherein the curvilinear profile of the first portion curves more than 180 degrees.

15. The folding vehicle seat of claim 10 wherein the aperture is defined entirely by an upper surface of the seat back.

16. A vehicle seat comprising:
a seat back defined at an upper portion by a front surface, a top surface, and a rear surface;
a head restraint support member having a first portion pivotally coupled to the seat back and a second portion outwardly extending through an aperture defined entirely by the top surface of the seat back; and
a head restraint cushion coupled to the second portion of the head restraint support member,
wherein the head restraint support member has a curvilinear profile at the first portion and is adapted for rotating at least 90 degrees towards the front surface of the seat back from an upright use position to a retracted storage position.

17. The vehicle seat of claim 16, wherein the aperture is an elongated slot extending in a longitudinal direction relative to the seat back.

18. The vehicle seat of claim 16, wherein first portion of the support member is concealed within the upper portion of the seat back when the cushion is in the use position.

19. The vehicle seat of claim 16, wherein the head restraint support member rotates more than 90 degrees when rotating from the use position to the storage position.

20. The vehicle seat of claim 16, wherein the curvilinear profile of the first portion curves more than 180 degrees.

* * * * *